March 17, 1953 — G. C. SZIKLAI — 2,632,045
ELECTROCHEMICAL COLOR FILTER
Filed Aug. 31, 1948 — 2 SHEETS—SHEET 1

INVENTOR
GEORGE C. SZIKLAI
BY
ATTORNEY

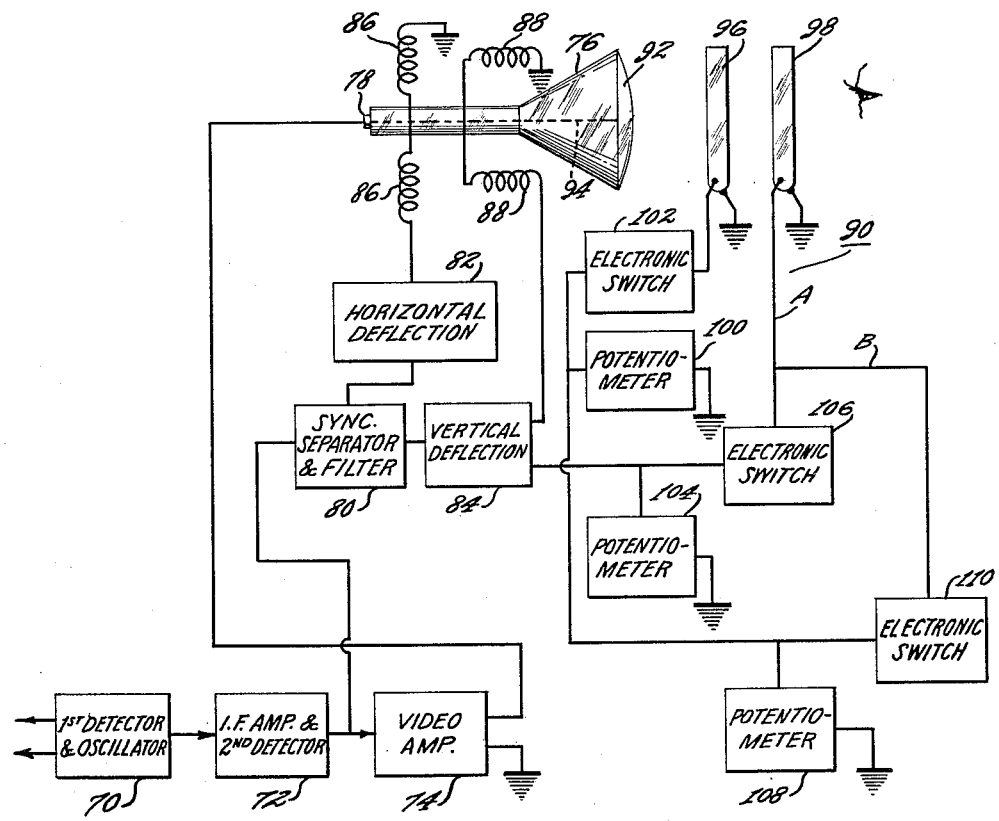

Patented Mar. 17, 1953

2,632,045

UNITED STATES PATENT OFFICE 2,632,045

ELECTROCHEMICAL COLOR FILTER

George C. Sziklai, Princeton, N. J., assignor to Radio Corporation of America, a corporation of Delaware Application August 31, 1948, Serial No. 46,945

7 Claims. (Cl. 178—5.4)

This invention relates to a novel form of color filter having the advantage over color filters of the usual colored glass or gelatin type that its color may be continuously varied without mechanically substituting one filter element for another.

More particularly, the present invention relates to a novel form of color filter in which the color is controlled by applying a definite controlled potential to electrodes contacting a solution of a chemical indicator which changes color within some particular range of pH values.

Up to the present time, color filters used in photography or for obtaining desired lighting effects, etc., have generally comprised either glass or synthetic resinous plates having incorporated therein a definite percentage of coloring matter in order to impart the characteristic of permitting maximum transmission of light of a particular wavelength and, perhaps, the exclusion of light of a certain range of wavelengths.

One object of the present invention is to provide a novel form of color filter, the wavelength transmitting characteristics of which may be varied while in use.

Another object of the invention is to provide a continuously variable color filter utilizing chemical indicators.

Another object of the invention is to provide a novel form of electrochemical color filter utilizing an indicator which transmits light predominantly of two widely differing wavelengths at different pH values.

Another object of the invention is to provide a novel lens which may have its light filtering characteristics continuously varied.

Another object of this invention is to provide a novel color filter, the characteristics of which may be changed by applying to its terminal an electrical signal train.

Another object of the invention is to provide a novel system of sequential color television.

Figure 1:
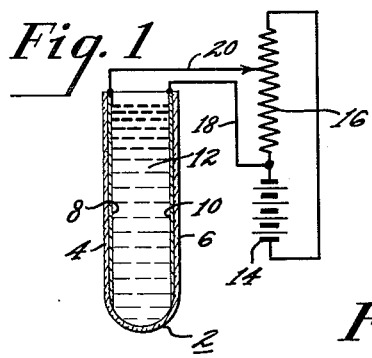
Figure 2:
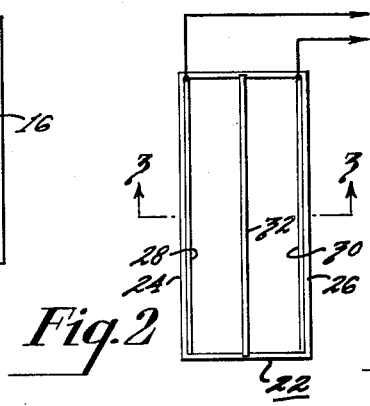
Figure 3:
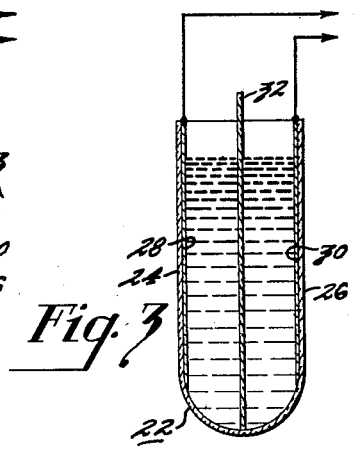
Figure 4:
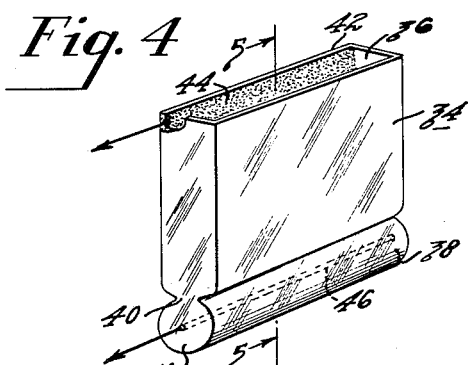
Figure 5:
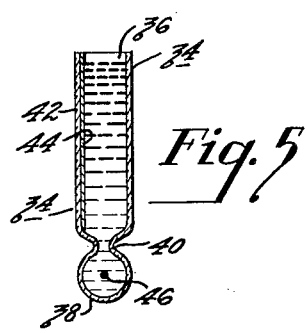
Figure 6:
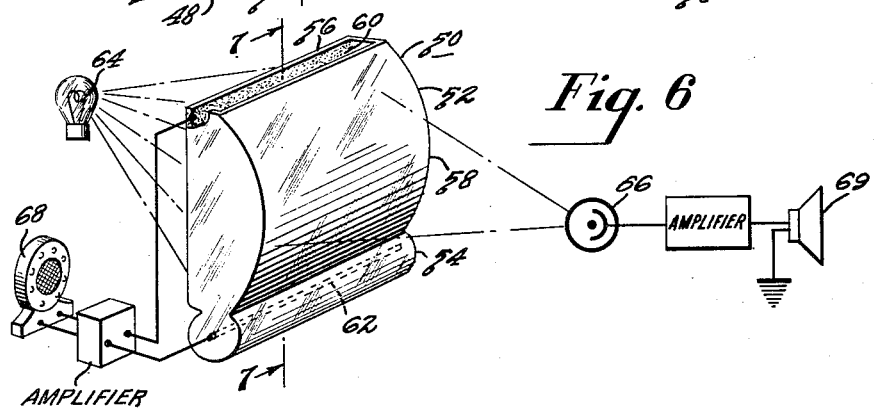
Figure 7:
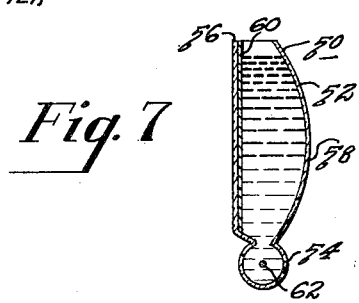

These and other objects will be more apparent and the invention will be better understood from the following specification when taken in connection with the drawings of which, Fig. 1 is a view partially in transverse section of one embodiment of apparatus constructed according to the present invention, Fig. 2 is a plan view of another embodiment of apparatus constructed in accordance with the present invention, Fig. 3 is a transverse sectional view of the apparatus of Fig. 2 taken along the line 3—3, Fig. 4 is a perspective view of a third embodiment of apparatus constructed in accordance with the present invention, Fig. 5 is a transverse sectional view taken along the line 5—5 of Fig. 4, Fig. 6 is a perspective view of another form of apparatus utilizing the principles of the present invention, Fig. 7 is a transverse sectional view taken along the line 7—7 of Fig. 6, and Fig. 8 is a schematic view of still another form of apparatus utilizing the principles of the present invention.

It has been well known that the pH of a solution may be measured in terms of the E. M. F. that can be measured between electrodes contacting the solution. Various techniques for measuring pH in this manner and for determining the end point of reactions involving acidimetry and alkalimetry are found throughout the literature of physical chemistry.

It is also known that the pH of a solution containing sources of hydrogen and hydroxyl ions can be changed by an applied E. M. F. using apparatus which passes a direct current through the solution. This change in pH occurs in the vicinity of the electrodes since an excess of hydrogen ions will accumulate in the vicinity of the cathode while an excess of hydroxyl ions will accumulate in the vicinity of the anode. It, therefore, follows that an indicator placed in the solution will exhibit its characteristic acid color in the vicinity of the cathode and its characteristic alkaline color in the vicinity of the anode, provided that the proper indicator is selected for the solution which is being used. It also follows that the depth of color of the indicator will also be able to be controlled within certain limits by varying the magnitude of the E. M. F. which is applied. The manner in which pH is related to E. M. F. is expressed in the equation:

$$pH = \frac{E.\ M.\ F. - 0.34}{0.06}$$

This formula applies to a solution of sodium chloride slightly acidified with hydrochloric acid at a temperature of 20° C. The constants would be somewhat different for different ions and for other temperatures.

The above information has been utilized in constructing improved apparatus which may serve as a continuously variable color filter according to the teachings of the present invention.

Referring now more particularly to Fig. 1, there is shown one embodiment of simple apparatus related to one aspect of the invention. This apparatus comprises a thin walled narrow vessel 2 having side walls constructed of either transparent glass or a transparent synthetic resinous material such as polymethyl methacrylate. The walls are preferably flat and the vessel of but a few millimeters in thickness but it does not necessarily have these limitations. Each of the longitudinal walls 4 and 6 of the vessel is provided on its inner surface with a light transmitting electrode 8 and 10. This is preferably a very thin coating of gold applied by either the well known evaporation technique in vacuum or the equally well known cathode sputtering technique. Thin layers of other metals may also be used, provided they do not react with the solution used in the vessel. There may also be used thin fine mesh screens of one of the noble metals, or electrically conducting glass may be used.

The vessel 2 is filled with the solution 12 which is to be utilized as the color filtering medium.

A potential is applied to the electrodes 8 and 10 from a potentiometer which may consist of a source of direct E. M. F. such as a battery 14 and a resistance 16 connected across the battery. One of the electrodes 10 is connected to an end of the resistance through a fixed lead 18 while the other electrode 8 makes sliding contact with the resistance through an adjustable lead 20.

The device may be operated as a color filter as follows:

*Example 1*

A 0.1 normal solution of sodium chloride slightly acidified with hydrochloric acid having added thereto a few drops of phenolphthalein solution was placed in a cell such as described above. The distance between the longitudinal walls of the cell was 3 mm. When a potential of about 0.94 volt was applied to the electrodes of the cell (phenolphthalein changes from colorless to pink within the pH range of 8.3 to 10), the solution adjacent the positively charged electrode immediately turned pink. The color was increased to a final maximum as the potential was gradually raised and under the conditions stated could be deepened to a color equivalent to that of Wratten No. 22. When the potential was decreased, the color of the solution became lighter until it disappeared altogether when the potential was below 0.85. The time lag between application of a particular potential and the appearance of a characteristic color was very short, being of the order of a few milliseconds. This is entirely adequate for most uses in the field of photography and in other fields where color filters are of practical value. In accordance with the equation previously given, relating to E. M. F. and pH, and a series of observations comparing colors obtained with known standards, a table of values may be calculated for any given solution giving the relationship between applied potential and standard color.

The form of color filter cell shown in Fig. 1 is suitable for use with indicators which change from a colorless form to a colored form. However, with indicators which change from one color to another within a particular pH range, undesirable mixing of the colors would occur using this type of apparatus. For example, in the case of Bromthymol blue (dibromothymolsulfonphthalein) which undergoes a color change of yellow to blue when the hydrogen ion concentration is changed such that the pH on the electrode is going from 6 to 7.6, a form of apparatus such as shown in Figs. 2 and 3 is more suitable for some applications while that shown in Figs. 4 and 5 is more suitably adapted for still other uses.

Referring now to Figs. 2 and 3, there is shown a vessel 22 having flat transparent longitudinally extending walls 24 and 26 which may be of glass or synthetic resinous plastic such as polymethyl methacrylate. Transparent electrodes 28 and 30 similar to those described in connection with Fig. 1 may be applied to the walls. Separating the vessel into two compartments such that each electrode is in one of the compartments is a longitudinally extending semipermeable transparent membrane 32 such as can easily be made in well known manner by casting a film of collodion on a polished surface. The collodion film may be stretched and cemented to the end walls and bottom of the cell.

*Example 2*

The cell shown in Figs. 2 and 3 was filled with the same dilute solution of sodium chloride used in Example 1 but this time a few drops of the indicator Bromthymol blue were added. In this case, just enough acid may be added to the saline solution to bring the indicator to its transition color of green before any external potential is applied. When a potential of about 0.8 v. is applied to the electrodes, a blue color appears at the anode and a yellow color appears at the cathode. As the potential is increased above 0.8 v., the colors deepen in a regular manner. The semipermeable membrane serves to prevent any extensive mixing of the two colors. This form of color filter has extensive applications in color photography printing processes where combinations of two or more colors are desired. As the potential is decreased, the blue and yellow colors become less distinct until the point is reached when the potential is reduced to zero, the original starting color of green reappears. If polarity is reversed and the potential again raised, the colors appear at the opposite electrodes.

In this type of apparatus, any other type of two-color indicator may be used. Another example is Alizarin yellow which changes from yellow to red within the pH range of 5.5 to 6.8. Congo red and many others could also be used.

Another embodiment of apparatus constructed in accordance with the present invention and which is adapted to somewhat different uses is illustrated in Figs. 4 and 5. In this embodiment the vessel 34 also has two compartments, in this case an upper compartment 36 and a lower compartment 38 connected by means of a constricted opening 40. The upper compartment 36 has one of its longitudinally extending walls 42 provided with a light transmitting electrode 44 while the lower compartment 38 is provided with an electrode 46 which may be a platinum wire sealed into an end wall 48 of the vessel and extending therethrough. The two electrodes are provided with leads for connecting across a potentiometer as shown in Fig. 1. This type of apparatus enables an indicator to be used which changes from one color to another when it is desired to utilize the filtering properties of only one of the colors. Due to the presence of the constriction in the opening 40, there will be very little mixing of the two colors. By selecting the proper polarity for the electrode 44, either one of the characteristic colors of the indicator may be utilized.

The embodiment shown in Figs. 6 and 7 may be used for still different applications. These figures illustrate a form of the invention that may be used simultaneously as a color filter and as a liquid filled lens. A transparent vessel 50 is constructed so as to have an upper compartment 52 and a lower compartment 54. The upper compartment may be provided with two longitudinally extending light transmitting walls, one of which, 56, is flat and the other of which, 58, is curved convexly. When this vessel is filled with a liquid, it may serve as a lens for focussing a beam of light passing therethrough and as such it may be made part of an optical system. The flat wall 56 is provided with a transparent electrode 60 and the bottom compartment 54 is also provided with an electrode 62, both electrodes being similar to the corresponding electrodes described in connection with the apparatus shown in Figs. 4 and 5. When the device is operated similarly to that shown in Figs. 4 and 5, it will be apparent that there has been provided a continuously variable color filter and lens. This may be utilized in a signalling system, for example, including a light source 64 and photoelectric means 66 for detecting the intensity of the light transmitted through the unit. With a source of modulated sine wave potential applied as from a microphone 68, the corresponding variations of the color can be used to convey information, which information is recorded by connecting the output of the photoelectric tube 66 to loudspeaker 69 or cathode ray tube vertical deflection circuit. There is thus provided a color modulated type of telephone.

A further important aspect of the invention is in its application as part of a novel system of sequential type color television. The scanning system of the device may be of any usual type and may operate electronically; optically, as for example, by mirrors movable to deflect a light beam along a scanning path; or mechanically. The color separation means of this part of the invention may operate in conjunction with an image signal generating system or an image producing device. For these reasons, while the invention is disclosed illustratively as operating in conjunction with an electronic image producing scanner of the cathode ray tube variety, it will be understood that the invention is not limited thereto.

Referring to Fig. 8, a television receiver is shown schematically which is of the well known type comprising a first detector and a tunable oscillator indicated at 70, an intermediate frequency amplifier together with a second detector indicated at 72, a video amplifier 74 and an image producing device such as a cathode ray tube 76. The output signals of the video amplifier are supplied in the usual manner to the cathode ray tube 76, a terminal 78 of which is shown illustratively and schematically, and it will be understood that means are present for providing the usual biasing voltages for the several elements of this tube. The receiver is designed for the reception of the usual composite signal comprising image signals and horizontal and vertical sync pulses, a horizontal sync pulse following each scanning line or trace, and a vertical sync pulse occurring at the end of each vertical field and/or frame deflection and the signal would correspond to the color components of the image to be transmitted, as described more fully in "An Experimental Color Television System" by Kell et al., published in the RCA Review, June 1946, volume VII, No. 2, p. 141.

This composite signal is applied both to the cathode ray tube 76 and to a suitable sync pulse separating and filtering circuit indicated at 80. Usual and well known blanking methods (not shown) cause the tube 76 to respond only to the video or image signals. Horizontal sync pulses are supplied from the separating and filtering circuit 80 to a horizontal deflecting circuit 82, and vertical sync pulses are supplied to a vertical deflecting circuit 84. These deflecting circuits provide the usual oscillator triggering pulses and current waves of sawtooth shape in the horizontal and vertical deflecting coils 86 and 88, respectively.

The color filter device, which is more particularly the essence of this part of the present invention, indicated in its entirety by the reference character 90, is positioned so that it filters the light emitted by an image produced on the luminescent screen or target 92, scanned by a cathode ray beam 94, moving to produce a predetermined scanning pattern or raster under control of deflecting currents in the coils 86 and 88. The scanning pattern or raster which is coextensive with the produced image is, in general, rectangular. In the tricolor system of color television selected by way of example, the primary or component colors are red, green and blue for an additive color system, and they are exposed in a consistent predetermined sequence. In the illustrative example to be described herein, the exposure sequence may be regarded as being in the order named, although other orders may be selected when desired. It will be understood that the choice of primary or component colors and exposure sequence of the colors will depend entirely upon the color system selected for incorporation in the television transmitting equipment. The equipment for sequential scanning of the original view or image in different colors is not shown herein, but it will be understood that any system of scanning may be employed for developing a series of video or image signals to be applied at receiving points to an appropriate electrode or electrodes of the tube 76 in timed relationship to the effective color filtering conditions of the device 90 which is before the target area 92 or the target or mosaic area of the camera tube of a transmitter.

An arrangement for effecting television scanning at the transmitter end of a tricolor system wherein a storage type of cathode ray television camera tube is used to resolve the light image into signals for transmission is shown in Patent No. 2,297,524, granted to E. I. Anderson, September 29, 1942. It will be understood that the device 90 of this invention, now to be described in more detail, may be applied at the transmitter if color filter effects are to be interposed in the light path which includes the target area of the camera tube.

The filter device of this embodiment of the present invention comprises a series of filter cells 96 and 98 interposed in the light path between the viewing side of the luminescent viewing screen 92 of the cathode ray tube 76 and the eye of the observer. One of the cells, 96, is connected to a source of potential 100 through an electronic switch 102, which, in turn is connected to and operated from the vertical deflection circuit 84. The cell 98 is connected through one path, A, to a potentiometer 104 by way of an electronic switch 106, also operated from the vertical deflection circuit 84, and this same cell is also connected through a second path, B, to a potentiometer 108 through another electronic switch 110.

Each of the switches 102, 106 and 110 closes at the beginning of successive fields of scanning and stays closed for the whole scanning field. In a red, green, blue type of color system, filter cell 96 may be of the type illustrated in Fig. 1 and phenolphthalein may be the indicator used. Each time switch 102, to which this cell is connected, is closed, a potentiometer circuit 100 is closed, similar to that shown in Fig. 1, which applies a predetermined potential to the cell high enough to change the indicator from colorless to red. This may be about one volt or more but will depend upon the depth of color desired. In filter cell 98, which may be of the type shown in Figs. 4 and 5, there may be used an indicator such as Bromthymol blue which can be changed from yellow to blue. As this change occurs, the color goes through green. After the completion of the scan for the red flame, the switch 102 is opened and switch 106 is closed. This closes a circuit, applying a sufficiently high potential from potentiometer 104 to provide a high pH factor in the solution in filter cell 98. This changes the indicator to blue and the cell will transmit blue light only.

After the completion of the scan for the blue frame, switch 110 is closed and switch 106 is opened, completing the circuit through potentiometer 108, which is adjusted to apply a sufficiently low potential to change the color of the indicator to green.

This entire cycle is repeated as long as the apparatus is operative.

The switches for operating the color filters may be multivibrators triggered by the synchronizing circuits of the television receiver. These switches are well known prior art devices.

Many different types of color combinations can be obtained by using other indicators and different numbers of filter cells.

I claim as my invention:

1. A continuously variable electrochemical color filter comprising a filter cell including a fluid container, a fluid within said container capable of changing color in response to a change in pH within a certain range of pH values, said container being divided into two compartments, one of said compartments being adapted to be interposed in a light path and having opposing light transmitting walls, the other of said compartments being positioned below said one compartment, a constricted passage connecting said compartments to provide color separation means between said compartments, a pair of electrodes in contact with said fluid, one of said electrodes being adjacent one of said walls and being substantially transparent, the other of said electrodes being within said other compartment, and means for applying a range of D.-C. potentials to said fluid through said electrodes, said range of potentials including those necessary to produce said range of pH values.

2. A color filter according to claim 1 in which said substantially transparent electrode is a film of metal deposited on said wall.

3. In a light signalling system comprising a light source, means for modulating the light from said source such that a series of light signals is produced, photoelectric means for detecting the light signals and means for converting the light signals into signals of another type, said light signal producing means comprising an electrochemical light filter which includes a fluid container having opposed light transmitting walls, a fluid within said container capable of changing color within a certain range of pH values, a pair of electrodes contacting said fluid and means for applying to said electrodes modulating potentials within a range capable of changing said pH values within said certain range whereby light of varying color is transmitted to said photoelectric means.

4. Apparatus according to claim 3 wherein said fluid container comprises a liquid-filled lens.

5. A color television system employing an image producing device having an image persistence characteristic and means for providing said device with a plurality of series of image signals, each series of signals representing light values of component colors of a view or object, a color filter in the light path of said image producing device comprising an electrochemical light filter which includes a fluid container having opposing light transmitting walls, fluid within said container, said fluid being capable of changing color within a certain range of pH values, electrodes contacting said fluid, means for applying a predetermined potential to said electrodes, said potential being sufficient to produce a pH within said certain range, and means for synchronizing the application of said potential with one of said series of image signals.

6. A system according to claim 5 in which said electrochemical light filter comprises a plurality of containers each containing a fluid capable of changing to different colors and means for synchronizing the application of potentials to each with different series of image signals.

7. Apparatus for producing colored images comprising means for forming a series of luminous image portions represented components of a whole image, a plurality of color filtering devices positioned in the path of light emitted by said image, each of said color filtering devices comprising an electrochemical fluid light filter in which the color of said filter is responsive to the pH thereof, means for varying the pH of said fluid of each of said filters in a predetermined manner whereby the color of the fluid of said filters is varied, and means for synchronizing said pH varying means with said means for forming said series of image portions.

GEORGE C. SZIKLAI.

REFERENCES CITED

The following references are of record in the file of this patent:

UNITED STATES PATENTS

| Number | Name | Date |
|---|---|---|
| 1,505,656 | Martus | Aug. 19, 1924 |
| 1,739,478 | Bielecki | Dec. 10, 1929 |
| 1,955,923 | Land | Apr. 24, 1934 |
| 2,109,540 | Leishman | Mar. 1, 1938 |
| 2,128,228 | Betz et al. | Aug. 30, 1938 |
| 2,350,892 | Hewson | June 6, 1944 |
| 2,389,979 | Huffnagle | Nov. 27, 1945 |
| 2,493,200 | Land | Jan. 3, 1950 |

FOREIGN PATENTS

| Number | Country | Date |
|---|---|---|
| 328,017 | Great Britain | Apr. 16, 1930 |
| 473,061 | Great Britain | Oct. 5, 1937 |